(12) United States Patent
Chang et al.

(10) Patent No.: US 9,057,923 B2
(45) Date of Patent: Jun. 16, 2015

(54) WIRE, METHOD OF MANUFACTURE, AND RELATED APPARATUS

(75) Inventors: Chong Sup Chang, Hwaseong-si (KR); Yoonho Khang, Yongin-si (KR); Changoh Jeong, Suwon-si (KR); Sehwan Yu, Seoul (KR); Sangho Park, Suwon-si (KR); Su-Hyoung Kang, Bucheon-si (KR); Hyungjun Kim, Yongin-si (KR); Honglong Ning, Suwon-si (KR); Jinho Hwang, Osan-si (KR); Myounggeun Cha, Seoul (KR); Youngki Shin, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 914 days.

(21) Appl. No.: 13/163,528

(22) Filed: Jun. 17, 2011

(65) Prior Publication Data

US 2012/0086678 A1    Apr. 12, 2012

(30) Foreign Application Priority Data

Oct. 7, 2010   (KR) .......................... 10-2010-0097923

(51) Int. Cl.
*G02F 1/136* (2006.01)
*G02F 1/1343* (2006.01)
*G02F 1/1362* (2006.01)

(52) U.S. Cl.
CPC ..... *G02F 1/136286* (2013.01); *Y10T 29/49155* (2013.01); *G02F 2001/136236* (2013.01); *G02F 2001/136295* (2013.01); *G02F 2201/123* (2013.01)

(58) Field of Classification Search
CPC .................. G02F 1/136236; G02F 1/136286; G02F 1/136295; G02F 2001/13629
USPC ..................................... 349/147, 43, 139, 143
See application file for complete search history.

(56) References Cited

U.S. PATENT DOCUMENTS

| 7,435,632 | B2 | 10/2008 | Lee et al. | |
|---|---|---|---|---|
| 2006/0227268 | A1* | 10/2006 | Yoon | 349/129 |
| 2007/0200981 | A1* | 8/2007 | Souk et al. | 349/106 |
| 2007/0258035 | A1* | 11/2007 | Wang et al. | 349/187 |

FOREIGN PATENT DOCUMENTS

| KR | 100477142 | 3/2005 |
|---|---|---|
| KR | 1020050029512 | 3/2005 |

* cited by examiner

*Primary Examiner* — Nathanael R Briggs
(74) *Attorney, Agent, or Firm* — Innovation Counsel LLP

(57) ABSTRACT

A wire is provided on an insulating substrate to have a first thickness in a first area and a second thickness smaller than the first thickness in a second area except for the first area. A display apparatus includes the wire. The wire is formed by forming a first conductive layer and a second conductive layer on the insulating substrate and etching the first and second conductive layers using photoresist layer patterns having different thicknesses.

9 Claims, 25 Drawing Sheets

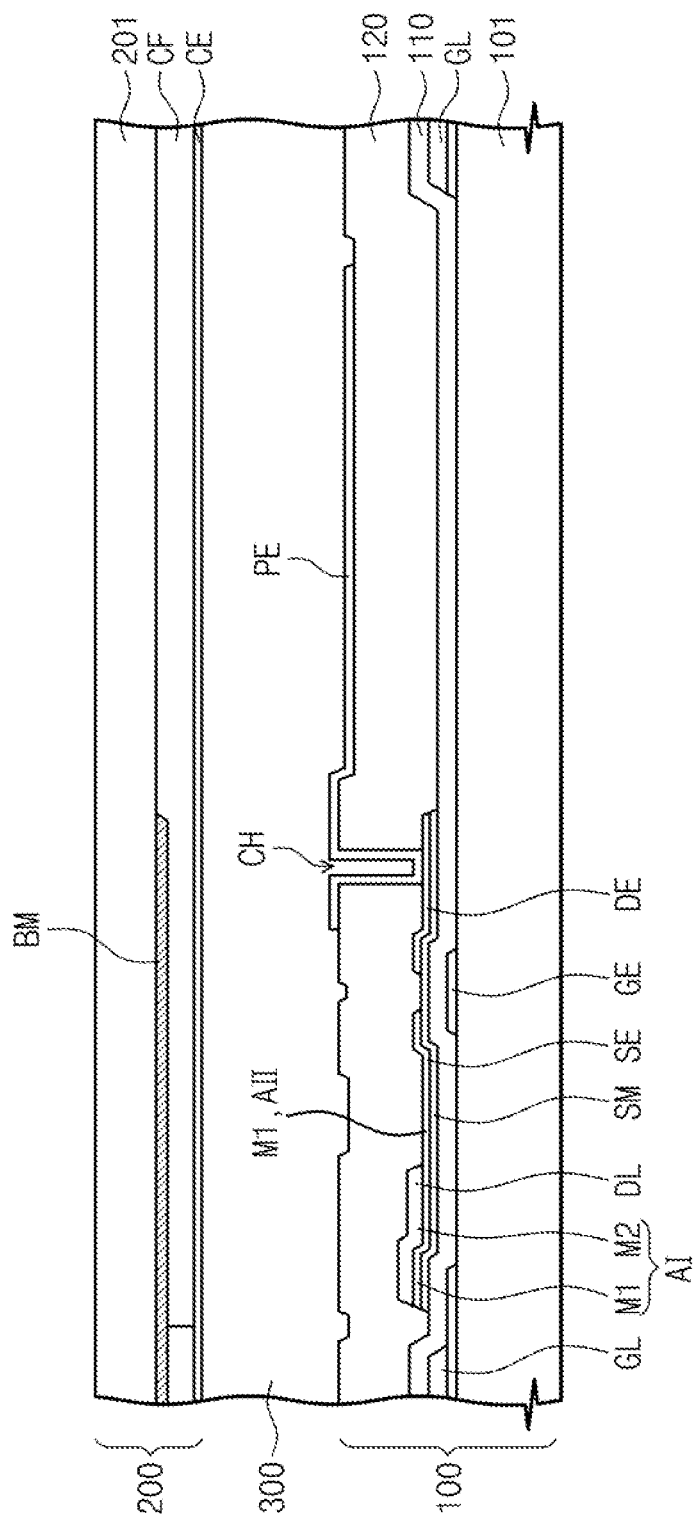

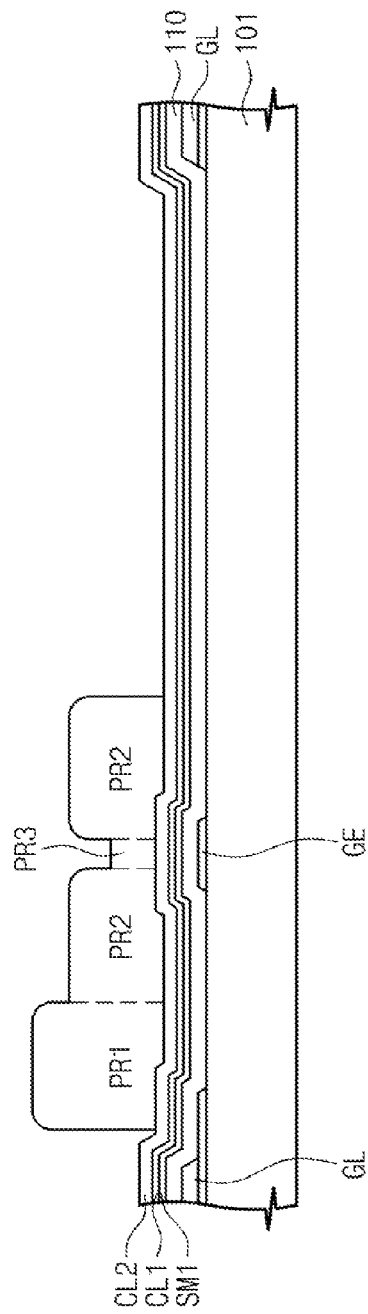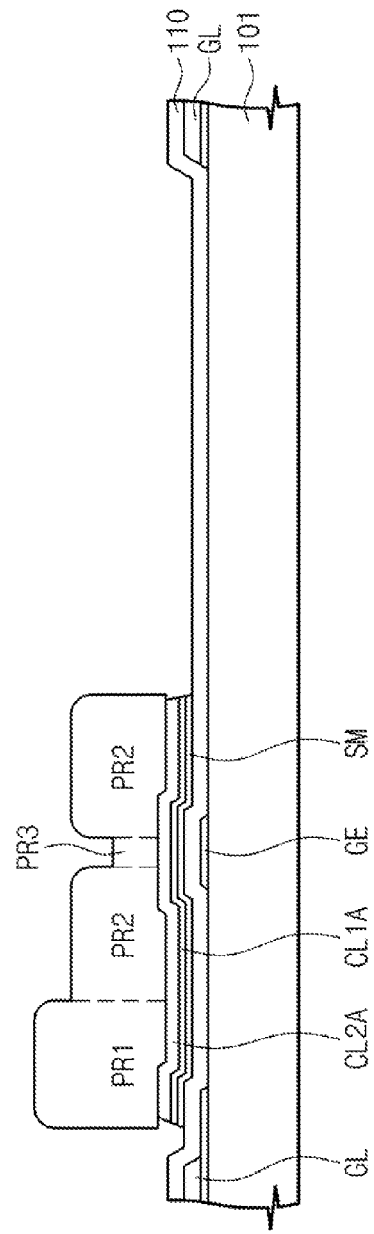

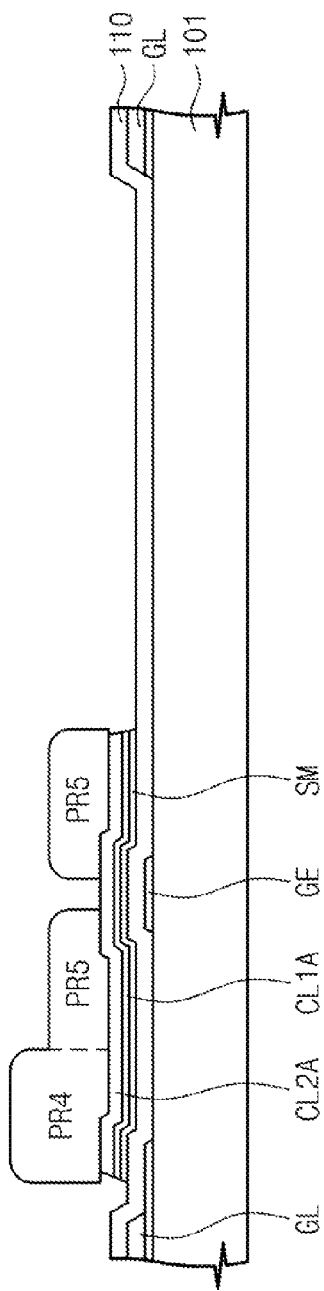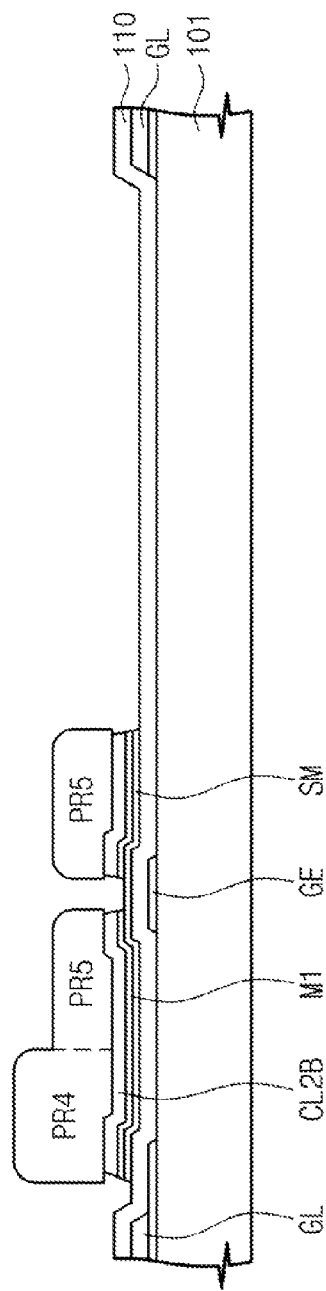

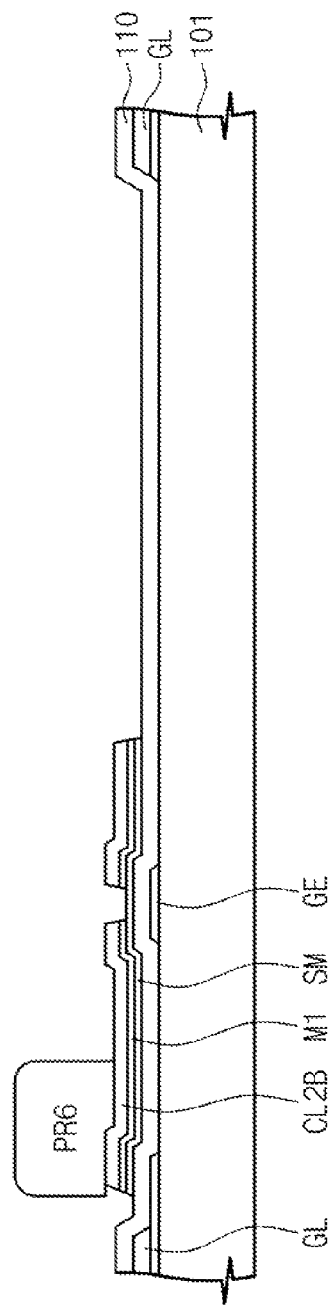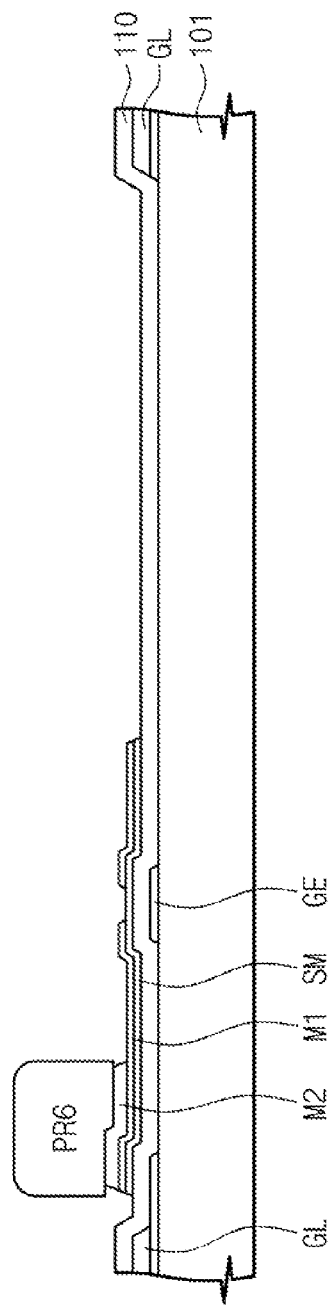

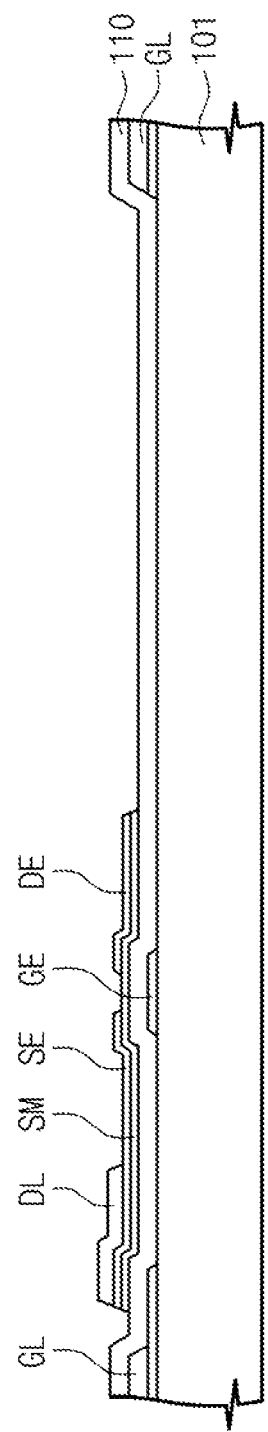

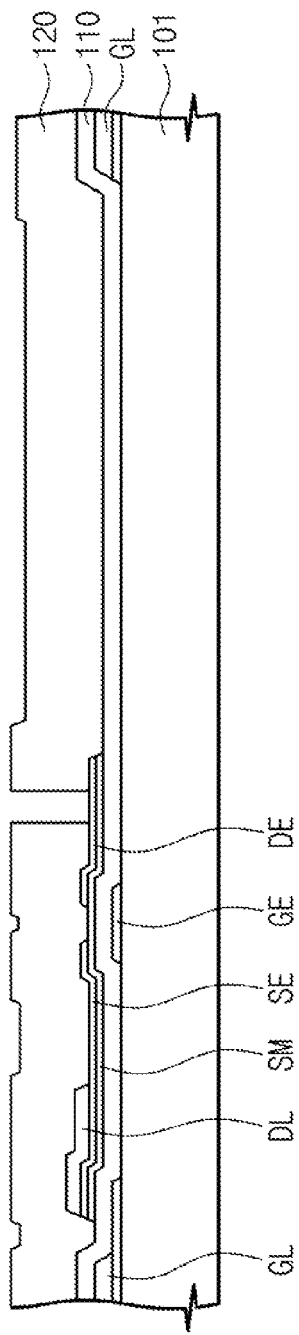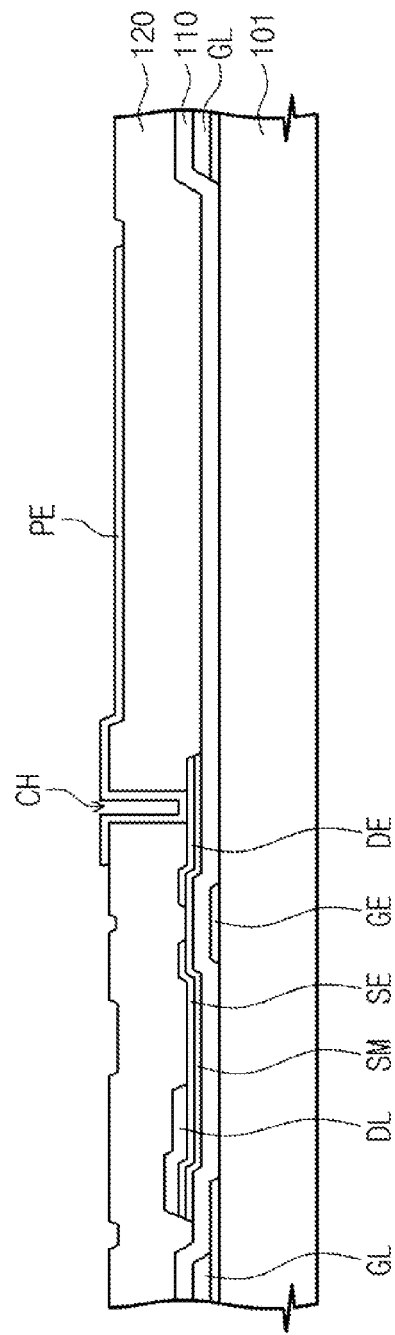

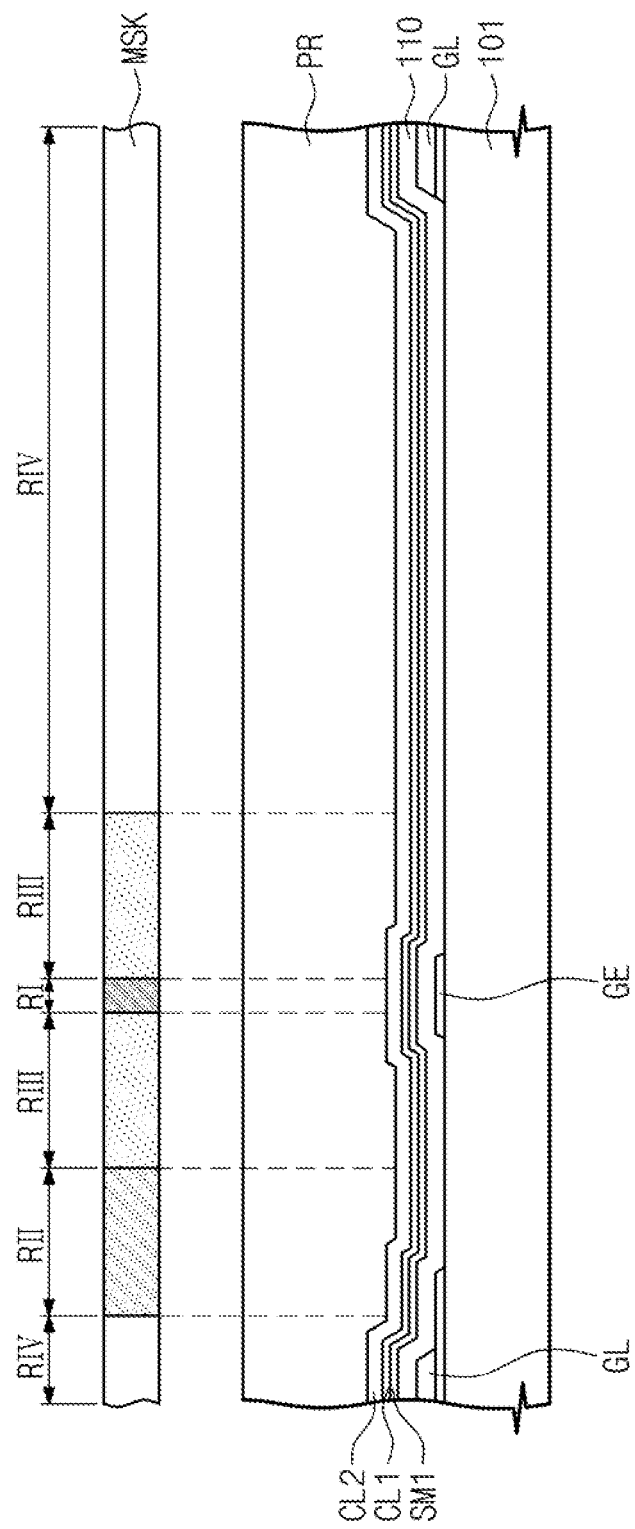

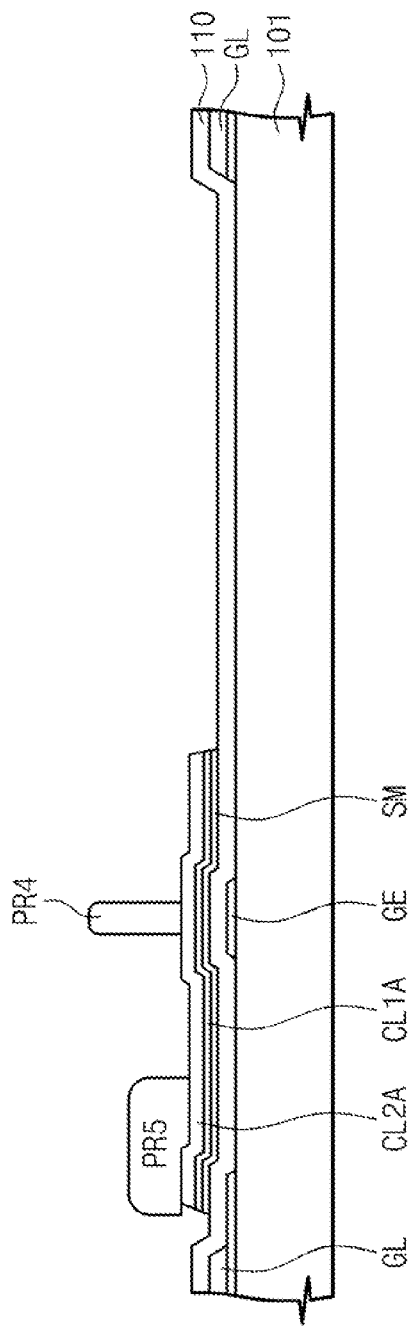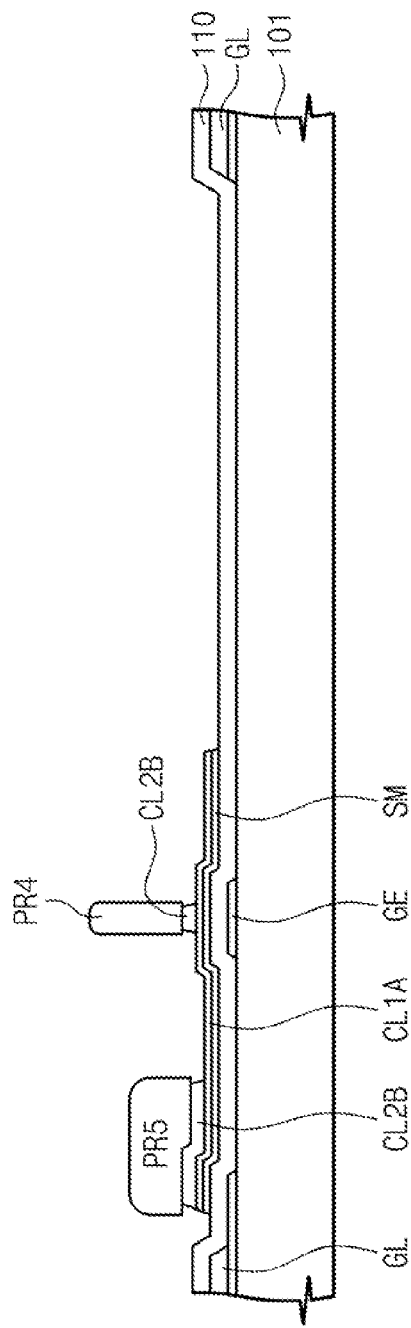

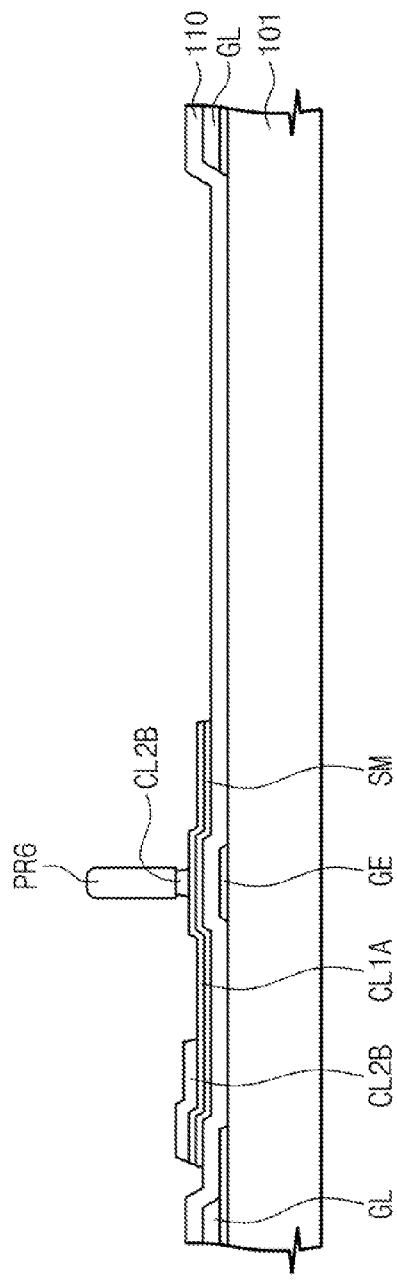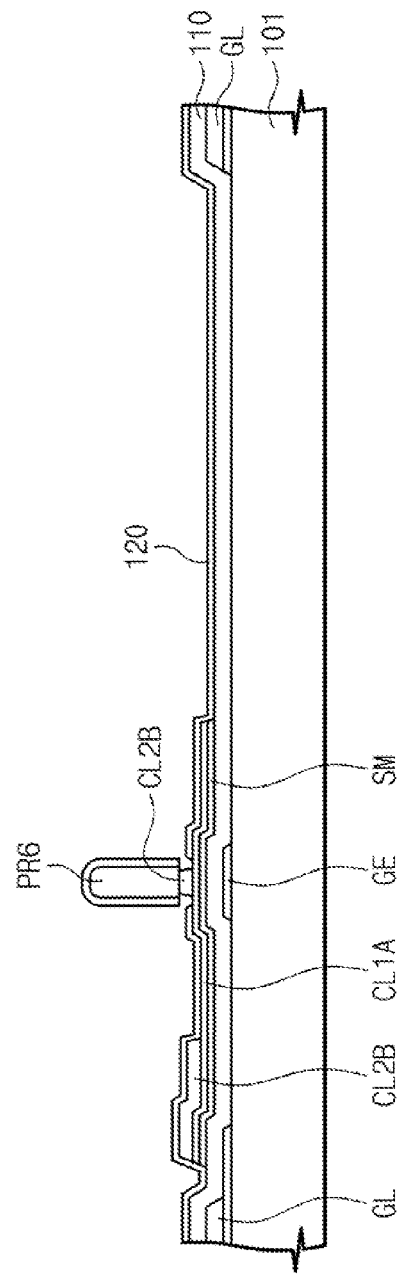

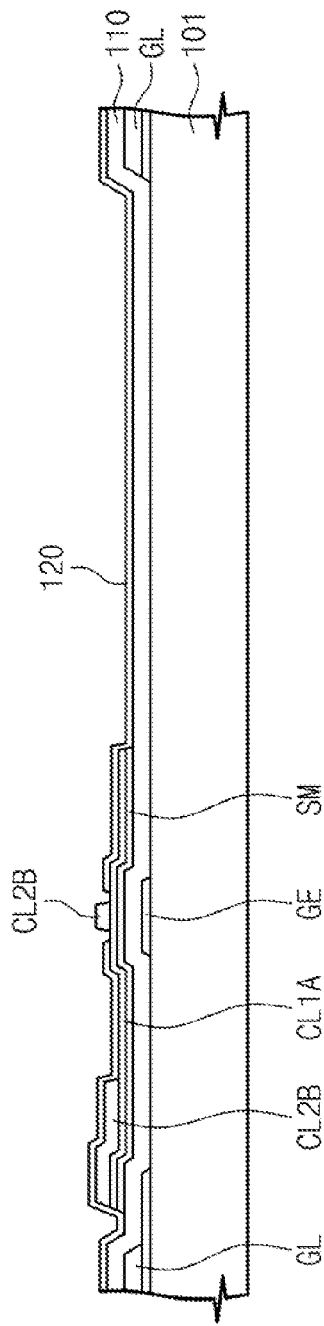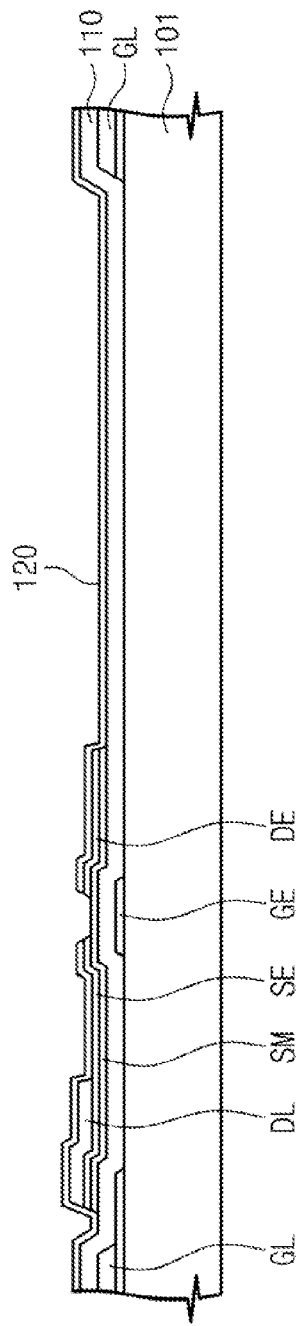

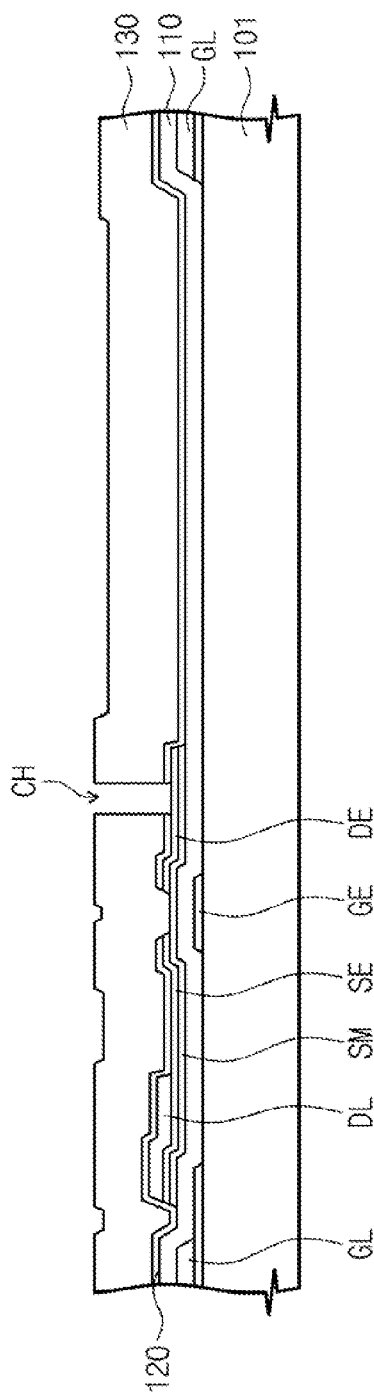
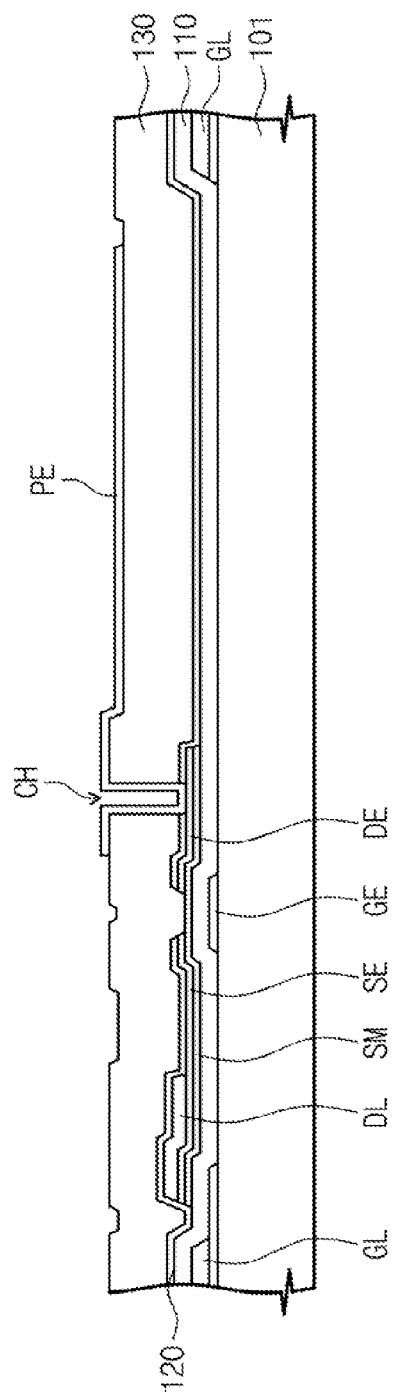

WIRE, METHOD OF MANUFACTURE, AND RELATED APPARATUS

CROSS-REFERENCE TO RELATED APPLICATION

This application relies for priority upon Korean Patent Application No. 10-2010-0097923 filed on Oct. 7, 2010, the contents of which are herein incorporated by reference in its entirety.

BACKGROUND

1. Field of Disclosure

The subject matter disclosed herein relates to a wire, a method of manufacturing the wire, a display apparatus having the wire, and a method of manufacturing the display apparatus.

2. Description of the Related Art

A liquid crystal display is one of the most widely used flat panel displays. The liquid crystal display includes two substrates and a liquid crystal layer interposed between the two substrates. The liquid crystal display applies an electric field to the liquid crystal layer to rearrange liquid crystal molecules of the liquid crystal layer, thereby controlling light amount of the light passing through the liquid crystal layer.

Electrodes and wires connected to the electrodes are arranged on at least one of the two substrates to apply the electric field to the liquid crystal layer. In general, the wires are formed of a low resistance material in a sufficient thickness.

In the case that each wire has uniform thickness throughout its length, a disconnection defect may occur in the overlap area in which the gate line GL overlaps with the data line DL or where the thin film transistor is formed due to a step difference between the area in which the wires are stacked and the area in which the wires are not formed.

SUMMARY

In the display apparatus according to an exemplary embodiment, the thickness of the wires in which plural layers are stacked may be controlled, thereby preventing the wire from being disconnected. In an exemplary embodiment, each of the wires formed in the area in which the wires are stacked has a relatively thin thickness. Accordingly, although multiple wires are stacked in the area, the step difference between various elements for the first substrate may be reduced, thereby preventing disconnection of the wires.

In one exemplary embodiment, since the wire has a different thickness according to different areas, the disconnection of the wire may be prevented even though the wire is overlapped with others.

In one exemplary embodiment, a display apparatus employs the wire to prevent the wire from being disconnected. In addition, the wire may be patterned by a single photolithography process, so the manufacturing time and cost for the wire may be reduced. Further, in the display apparatus, each of a first and a second wire part may be formed to have different thicknesses using four masks, to thereby reduce manufacturing time and cost for the display apparatus.

BRIEF DESCRIPTION OF THE DRAWINGS

FIG. 2 is a sectional view taken along a line I-I' of FIG. 1;

FIGS. 7A to 7H are sectional views showing a second photolithography process of a method of manufacturing a display apparatus according to a first exemplary embodiment;

FIGS. 8A and 8B are sectional views showing a third photolithography process and a fourth photolithography process of a method of manufacturing a display apparatus according to a first exemplary embodiment;

FIGS. 9A to 9I are sectional views showing a second photolithography process of a method of manufacturing a display apparatus according to a second exemplary embodiment; and FIGS. 10A and 10B are sectional views showing a third photolithography process and a fourth photolithography process of a method of manufacturing a display apparatus according to a second exemplary embodiment.

DETAILED DESCRIPTION

Figure 1:
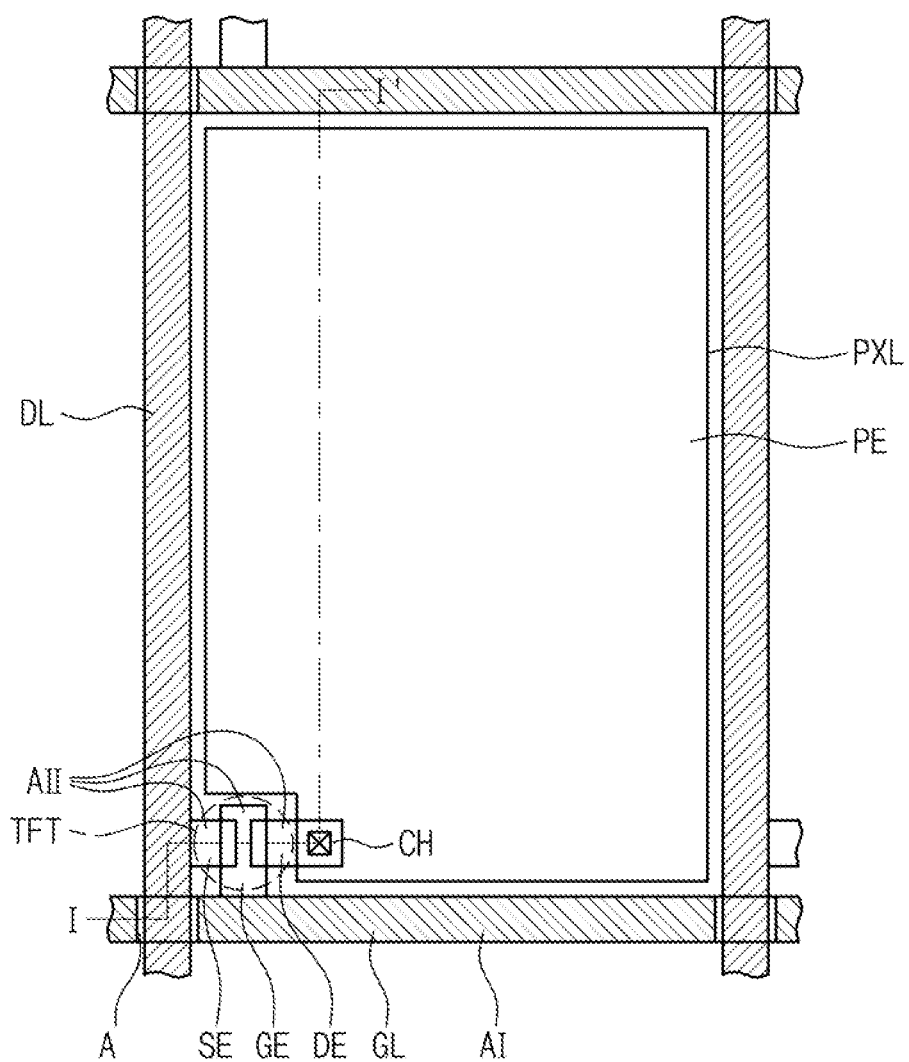
FIG. 1 is a plan view showing a display apparatus according to a first exemplary embodiment.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a plan view showing a display apparatus according to a first exemplary embodiment, and FIG. 2 is a sectional view taken along a line I-I' of FIG. 1. In the present exemplary embodiment, a liquid crystal display will be described as an example of the display apparatus.

Referring to FIGS. 1 and 2, the liquid crystal display includes a first substrate 100, a second substrate 200 facing the first substrate 100, and a liquid crystal layer 300 interposed between the first substrate 100 and the second substrate 200.

The first substrate 100 includes a plurality of gate lines GL, a plurality of data lines DL, and a plurality of pixels each connected to a corresponding gate line of the gate lines GL and a corresponding data line of the data lines DL. In the present exemplary embodiment, the pixels PXL have the same structure and function, so for the convenience of explanation, one pixel PXL has been shown in FIG. 1 with two gate lines GL adjacent to each other and two data lines DL adjacent to each other.

The first substrate 100 includes a first insulating substrate 101, a first wire part, a second wire part, and a pixel PXL.

The first wire part is provided on the first insulating substrate 101 to transmit a first signal. The first wire part includes the gate line GL extended in a first direction to transmit the first signal and a gate electrode GE connected to the gate line GL.

The first wire part has a first thickness in a first area AI and a second thickness in a second area AII except for the first area AI. In FIG. 1, the first area AI has been indicated by an oblique line pattern to be distinct from the second area AII.

In the present exemplary embodiment, the second area AII includes an area in which the first wire part is overlapped with the second wire part. The second area AII may have a width wider than a width of the second wire part in consideration of misalign in the process of forming the second wire part. Among the first wire part, a portion of the gate line GL and the gate electrode GE correspond to the second area AII. That is, the gate line GL has the second thickness in the area in which the gate line GL is overlapped with the data line DL and has the first thickness except for the overlap area. The gate electrode GE has the second thickness since the gate electrode GE is partially overlapped with a source electrode SE and a drain electrode DE.

The first wire part includes a first metal layer M1 and a second metal layer M2 disposed on the first metal layer M1 in the first area AI and includes the first metal layer M1 in the second area AII. The first metal layer M1 may have a thickness different from a thickness of the second metal layer M2. For instance, the first metal layer M1 may have the thickness of about 2000 angstroms to about 4000 angstroms and the second metal layer M2 may have the thickness of about 10000 angstroms to about 15000 angstroms. Although not shown in FIGS. 1 and 2, a barrier layer (not shown) may be further disposed between the first insulating substrate 101 and the first metal layer M1 in order to prevent impurities in the first insulating substrate 101 from being diffused. The barrier layer may have a thickness of about 150 angstroms to about 250 angstroms and include a metal material such as titanium.

The second wire part is provided on the first insulating substrate 101 while being insulated from the first wire part to output a second signal in response to the first signal. The second wire part includes the data line DL extended in a second direction different from the first direction to transmit the second signal, the source electrode SE connected to the data line DL, and the drain electrode DE spaced apart from the source electrode SE.

When viewed in a plan view, the second wire part has the thickness in the second area AII including the overlap area in which the first wire part is overlapped with the second wire part. The data line DL of the second wire part corresponds to the first area AI. However, the source electrode SE and the drain electrode DE of the second wire part correspond to the second area AII since the source electrode SE and the drain electrode DE are partially overlapped with the gate electrode GE. That is, the data line DL has the first thickness, and the source electrode SE and the drain electrode DE have the second thickness. According to another exemplary embodiment, the data line DL may have the second thickness in the overlap area and have the first thickness in an area except for the overlap area.

A first insulating layer 110 is disposed between the first wire part and the second wire part. The first insulating layer 110 is provided on the first insulating substrate 101 to cover the gate line GL.

A semiconductor pattern SM is disposed between the first insulating layer 110 and the second wire part to overlap with the gate electrode GE. The semiconductor pattern SM overlaps with a portion of the source electrode SE and a portion of the drain electrode DE and serves as a channel between the source electrode SE and the drain electrode DE.

A second insulating layer 120 is provided on the second wire part. The second insulating layer 120 is provided on the first insulating substrate 101 to cover the gate line GL, the data line DL, the source electrode SE, and the drain electrode DE. The second insulating layer 120 may have a contact hole CH formed therethrough to expose a portion of the drain electrode DE.

The pixel PXL is connected to the second wire part to receive the second signal and display an image. The pixel PXL is connected to the drain electrode DE through the contact hole CH and includes a pixel electrode PE charged with a pixel voltage by receiving the second signal.

The second substrate 200 includes a second insulating substrate 201, a black matrix BM, a color filter layer CF, and a common electrode CE.

The black matrix BM is provided on the second insulating substrate 201 to block the light passing through the liquid crystal layer 300.

The color filter layer CF is provided on the second insulating substrate 201 to cover the black matrix BM. The color filter layer CF realizes red, green, and blue colors.

The common electrode CE is disposed on the color filter layer CF. The common electrode CE forms an electric field together with the pixel electrode PE to drive the liquid crystal layer 300.

In the first substrate 100, the gate electrode GE, the semiconductor pattern SM, the source electrode SE, and the drain electrode DE form a thin film transistor that drives the pixel PXL. Hereinafter, the first substrate 100 will be referred to as a thin film transistor substrate because the thin film transistor TFT is formed.

According to the display apparatus, when the thin film transistor TFT is turned on in response to the first signal applied through the gate line GL, the second signal applied through the data line DL is applied to the pixel electrode PE through the turn-on thin film transistor TFT. Thus, the electric field is generated between the pixel electrode PE and the common electrode CE to which the common voltage is applied. The liquid crystal molecules in the liquid crystal layer 300 are driven by the electric field, so that the image is displayed in accordance with the light amount of the light passing through the liquid crystal layer 300.

In the display apparatus according to the present exemplary embodiment, the thickness of the wires in which plural layers are stacked may be controlled, thereby preventing the wire from being disconnected. In the case that each wire has uniform thickness throughout its length, the disconnection defect may occur in the overlap area in which the gate line GL overlaps with the data line DL or the thin film transistor is formed. This is because a step difference occurs between the area in which the wires are stacked and the area in which the wires are not formed. However, according to the present exemplary embodiment, each of the wires formed in the area in which the wires are stacked has relatively thin thickness. Accordingly, although plural wires are stacked in the area, the step difference between the parts for the first substrate may be reduced, thereby preventing the disconnection of the wires.

Hereinafter, a method of manufacturing the wire having different thickness in two areas will be described, and then a method of manufacturing the thin film transistor substrate for the display apparatus according to the first exemplary embodiment will be described.

FIGS. 3A to 3G are sectional views showing a method of manufacturing a wire according to a first exemplary embodiment.

Figure 3A:
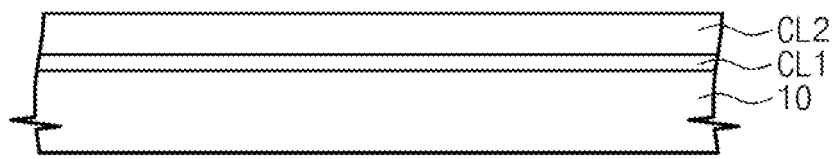
FIGS. 3A to 3G are sectional views showing a method of manufacturing a wire according to a first exemplary embodiment.

Referring to FIG. 3A, a first conductive layer CL1 is formed on a base substrate 10 using a first metal material and a second conductive layer CL2 is formed on the first conductive layer CL1 using a second metal material.

The first metal material has a different etch rate from that of the second metal material with respect to specific etchant method such as plasma etch.

Figure 3B:
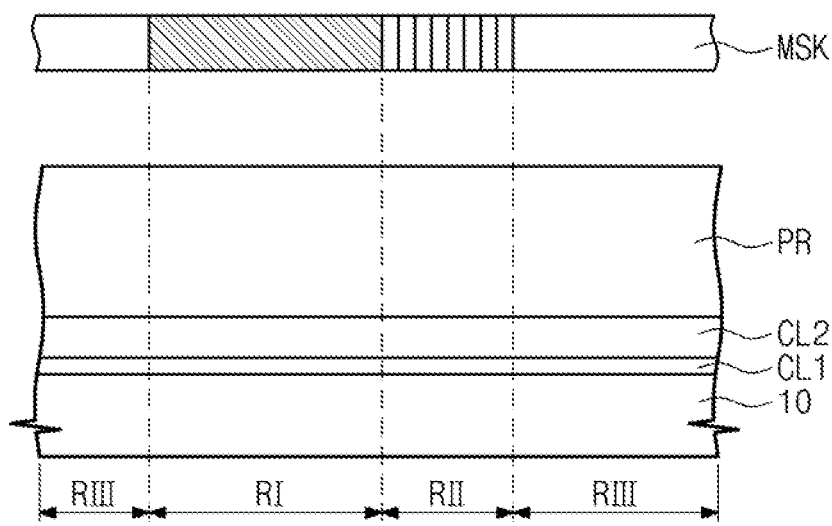
Figure 3C:
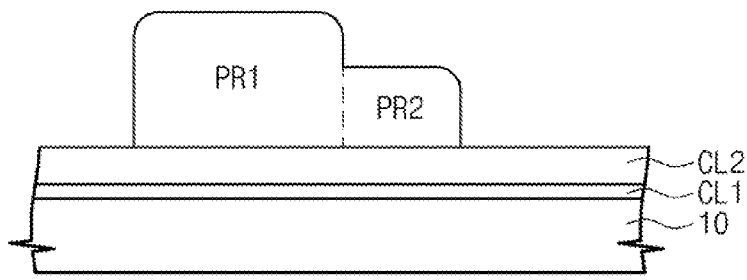

Then, as shown in FIG. 3B, a photoresist layer PR including photosensitive material is formed over the base substrate 10 and a light is irradiated onto the photoresist layer PR through a mask MSK to expose the photoresist layer PR to the light.

The mask MSK may be a diffraction mask or a slit mask. The mask MSK includes a first region RI to block the light, a second region RII to block a portion of the light and transmit a portion of the light, and a third region RIII to transmit the light. In the present exemplary embodiment, since the base substrate 10 is disposed under the mask MSK, the base substrate 10 may be divided into plural regions corresponding to the first, second, and third regions RI, RII, and RIII. Thus, the regions of the base substrate 10 will be referred to as a first region RI, a second region RII, and a third region RIII.

When the photoresist layer PR exposed to the light provided through the mask MSK is developed, a first photoresist layer pattern PR1 and a second photoresist layer pattern PR2 remain in the first region RI and the second region RII, respectively, and the photoresist layer PR corresponding to the third region RIII is completely removed to expose the surface of the base substrate 10. In this case, the exposure amount to the photoresist layer PR corresponding to the second region RII is larger than the exposure amount to the photoresist layer PR corresponding to the first region RI. Thus, the second photoresist layer pattern PR2 has a relatively smaller thickness than the first photoresist layer pattern PR1.

In the present exemplary embodiment, a positive photoresist is used to remove the exposed portion of the photoresist layer, but it should not be limited thereto or thereby. That is, a negative photoresist may be used to remove the no-exposed portion of the photoresist layer.

Figure 3D:
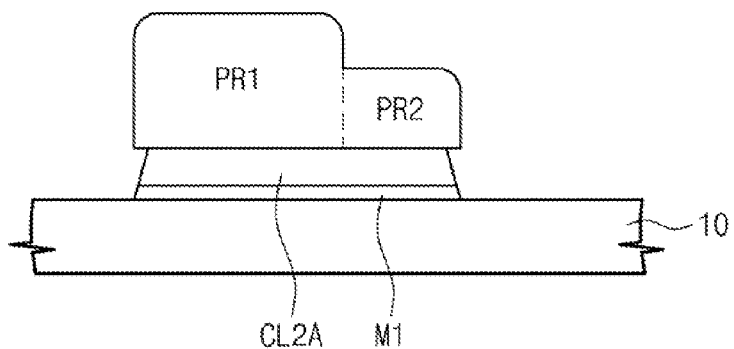

As shown in FIG. 3D, the first conductive layer CL1 and the second conductive layer CL2 disposed under the first and second photoresist layer patterns PR1 and PR2 are selectively removed by using the first and second photoresist layer patterns PR1 and PR2 as masks. As a result, a first conductive pattern CL1A and a second conductive pattern CL2A are formed.

Figure 3E:
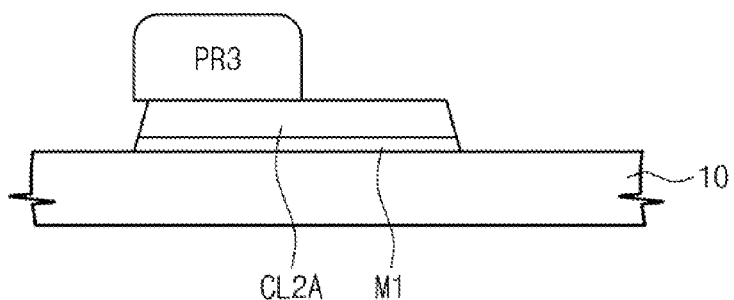

Then, a portion of the first photoresist layer pattern PR1 and the second photoresist layer pattern PR2 are removed by ashing process or etch back process as shown in FIG. 3E. Thus, the second photoresist layer pattern PR2 in the second region RII is completely removed, so a portion of the surface of the second conductive pattern CL2A is exposed. In addition, the first photoresist layer pattern PR1 is removed by the thickness of the second photoresist layer pattern PR2, thereby forming a third photoresist layer pattern PR3. Consequently, the third photoresist layer pattern PR3 remains only in the first region RI.

Figure 3F:
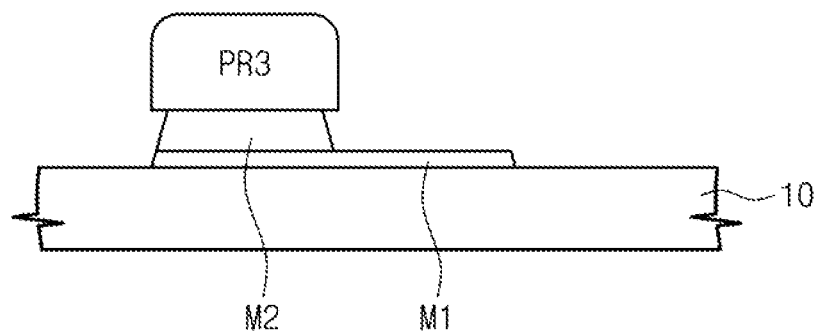
Figure 3G:
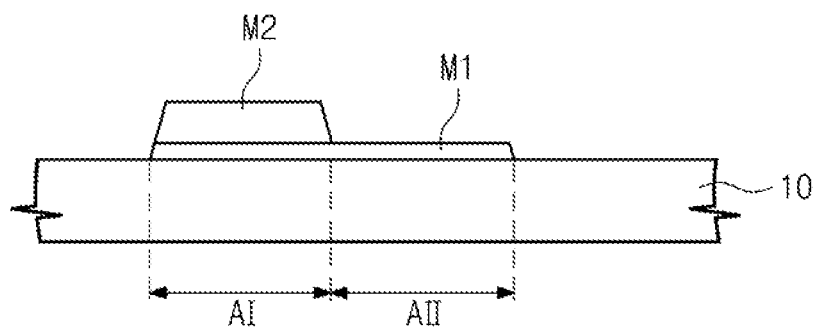

As shown in FIG. 3F, a portion of the second conductive pattern CL2A is removed by using the third photoresist layer pattern PR3 as a mask. Then, the third photoresist layer pattern PR3 is removed as shown in FIG. 3G.

Through the above processes, a wire including the first and second metal layers M1 and M2 in the first area AI corresponding to the first region RI and including the first metal layer M1 in the second area AII corresponding to the second region RII may be manufactured. In addition, the wire has the first thickness in the first area AI and the second thickness in the second area AII, which is smaller than the first thickness.

As described above, since the wire has various thicknesses in accordance with the regions, the disconnection of the wire may be prevented even though the wire is overlapped with others. In addition, the wire may be patterned by one time of the photolithography process, thereby reducing manufacturing time and cost of the wire.

In another exemplary embodiment, the second metal layer M2 may include an etch stop layer in order to increase the etch selectivity when the first and second conductive layers CL1 and CL2 are etched or the first and second conductive patterns CL1A and CL2A are etched.

FIGS. 4A to 4G are sectional views showing a method of manufacturing a wire according to a second exemplary embodiment. In FIGS. 4A to 4G, the same reference numerals denote the same elements in FIGS. 3A to 3G, and thus detailed descriptions of the same elements will be omitted.

Referring to FIG. 4, a first conductive layer is formed using the first metal material. The first conductive layer includes a main conductive layer CL1a and an etch stop conductive layer CL1b formed on the main conductive layer CL1a. The main conductive layer CL1a is formed of a main metal material such as copper. The etch stop conductive layer CL1b is formed of a metal material, such as titanium, molybdenum, etc., having an etch rate smaller than that of the main metal material. The etch stop conductive layer CL1b may have a thickness of about 50 angstroms to about 200 angstroms.

A second conductive layer CL2 having an etch rate larger than that of the etch stop conductive layer CL1b is formed on the etch stop conductive layer CL1b.

Figure 4A:
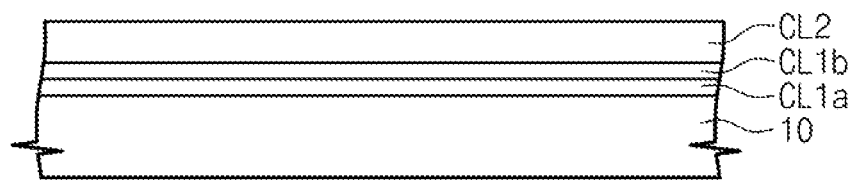
FIGS. 4A to 4G are sectional views showing a method of manufacturing a wire according to a second exemplary embodiment.
Figure 4B:
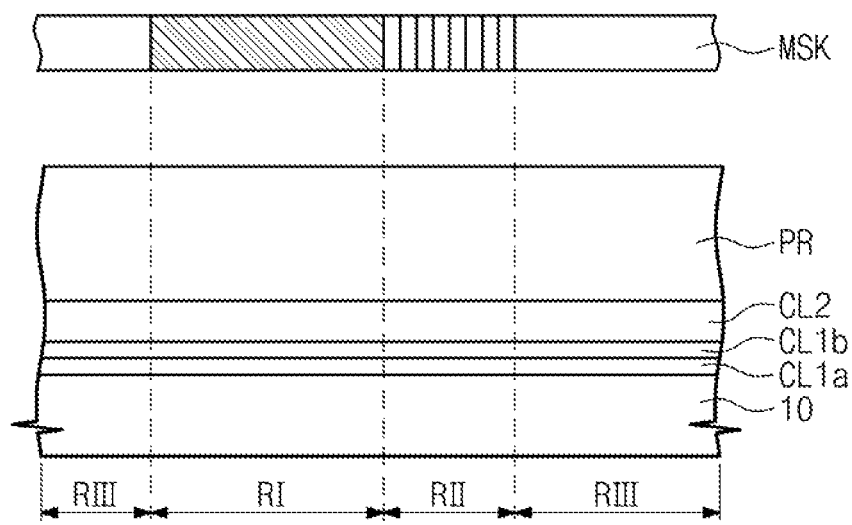

As shown in FIG. 4B, a photoresist layer PR including photosensitive material is formed over the base substrate 10 and a light is irradiated onto the photoresist layer PR through a mask MSK to expose the photoresist layer PR to the light.

Figure 4C:
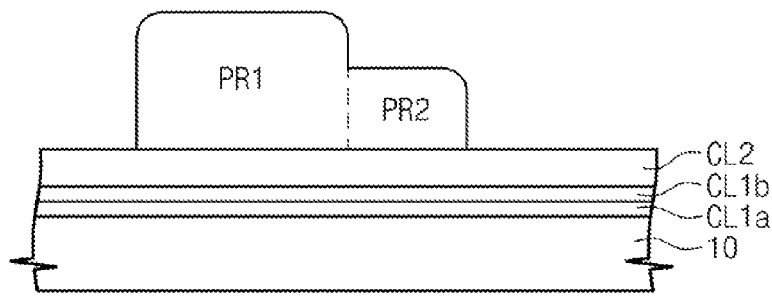

Then, when the photoresist layer PR exposed to the light provided through the mask MSK is developed, a first photoresist layer pattern PR1 and a second photoresist layer pattern PR2 having a thickness different from that of the first photoresist layer pattern PR1 are formed as shown in FIG. 4C.

Figure 4D:
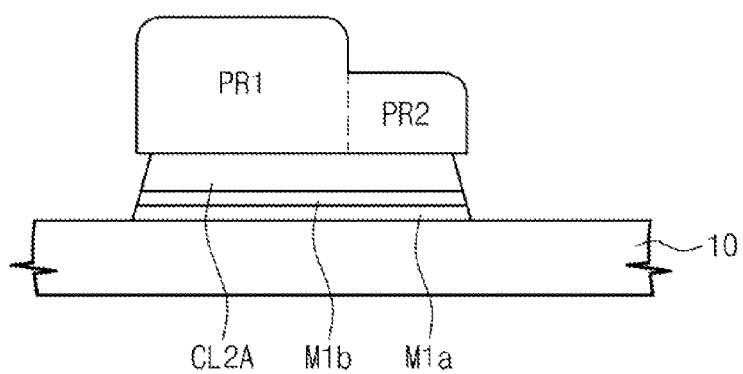

The main conductive layer CL1a, the etch stop conductive layer CL1b, and the second conductive layer CL2, which are formed under the first and second photoresist layer patterns PR1 and PR2, are selectively removed by using the first and second photoresist layer patterns PR1 and PR2 as a mask. Accordingly, a main metal layer M1a, an etch stop layer M1b, and a second conductive pattern CL2A are formed as shown in FIG. 4D.

Figure 4E:
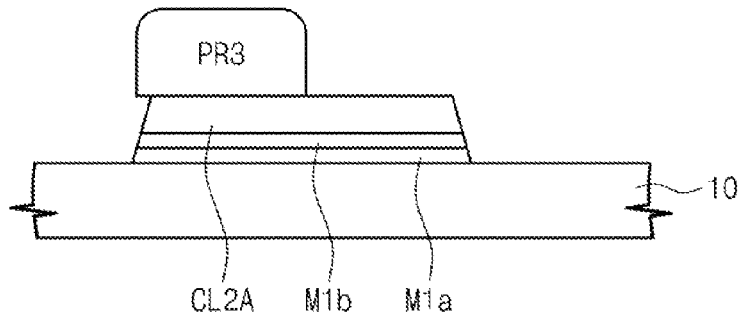

As shown in FIG. 4E, a portion of the first photoresist layer pattern PR1 and the second photoresist layer pattern PR2 are removed by ashing process or etch back process.

Figure 4F:
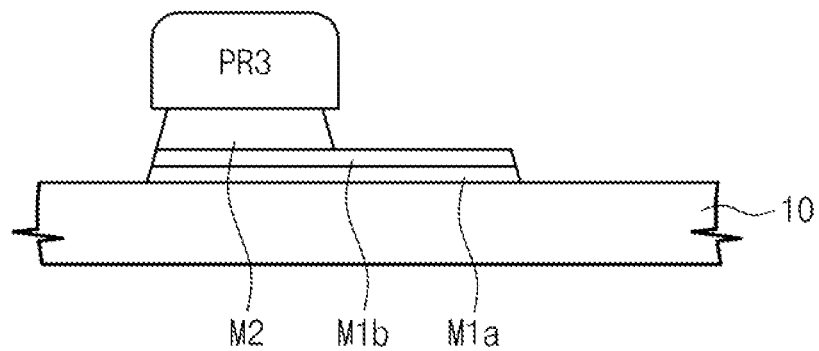

Then, the second conductive pattern CL2A is removed using the third photoresist layer pattern PR3 as a mask as shown in FIG. 4F. Since the etch stop layer M1b is formed under the second conductive pattern CL2A, the etch rate between the second conductive layer CL2 and the etch stop layer M1b may be easily adjusted.

Figure 4G:
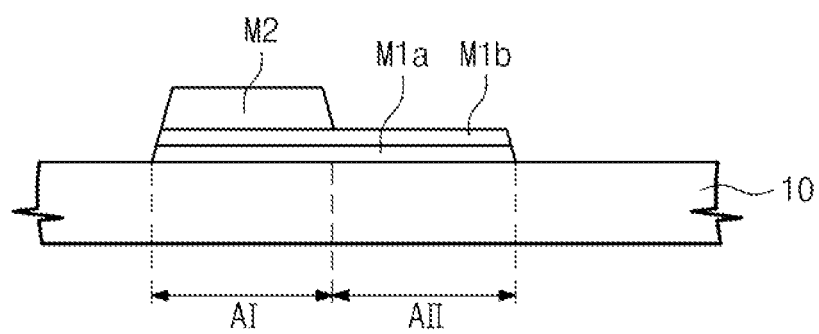

As shown in FIG. 4G, the third photoresist layer pattern PR3 is removed.

Through the above processes, a wire including the main metal layer M1a, the etch stop layer M1b, and the second metal layer M2 in the first area AI corresponding to the first region RI and including the main metal layer M1a and the etch stop layer M1b in the second area AII corresponding to the second region RII may be manufactured. In addition, the wire has the first thickness in the first area AI and the second thickness smaller than the first thickness in the second area AI.

Hereinafter, a method of manufacturing the thin film transistor substrate included in the display apparatus according to the first exemplary embodiment will be described. Particularly, the manufacturing method of the thin film transistor substrate employs the method of manufacturing the wire according to the first exemplary embodiment.

Figure 5A:
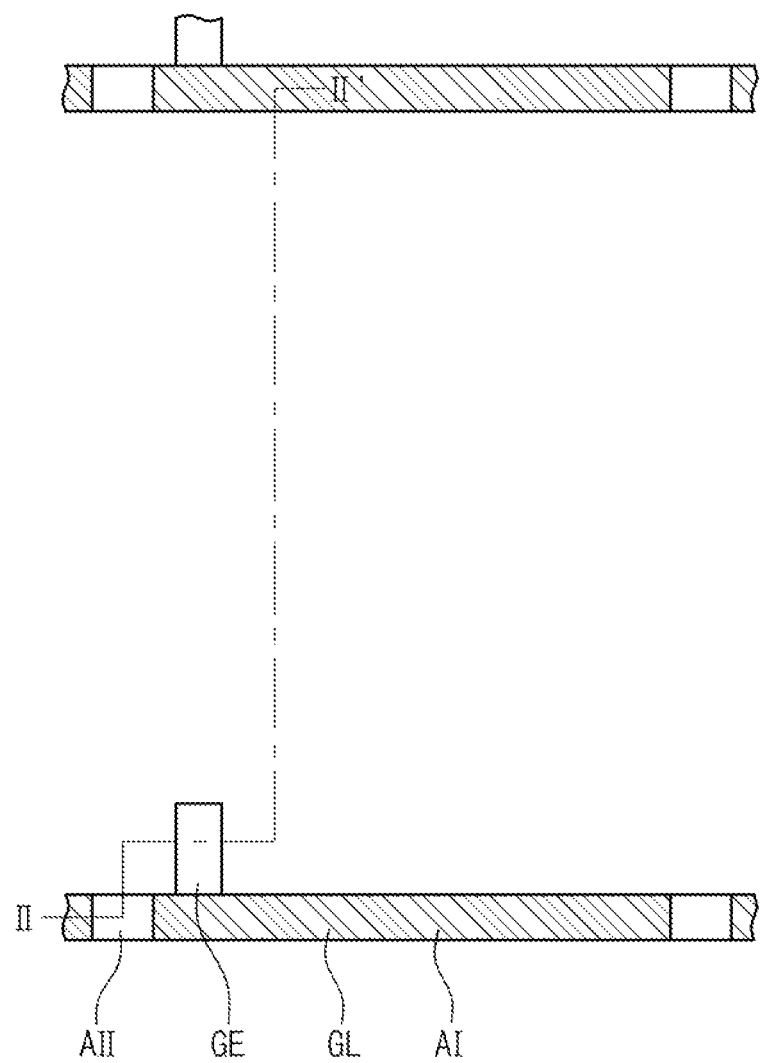
FIGS. 5A to 5C are plan views showing processes of forming a thin film transistor substrate of a method of manufacturing a display apparatus according to a first exemplary embodiment.
Figure 5B:
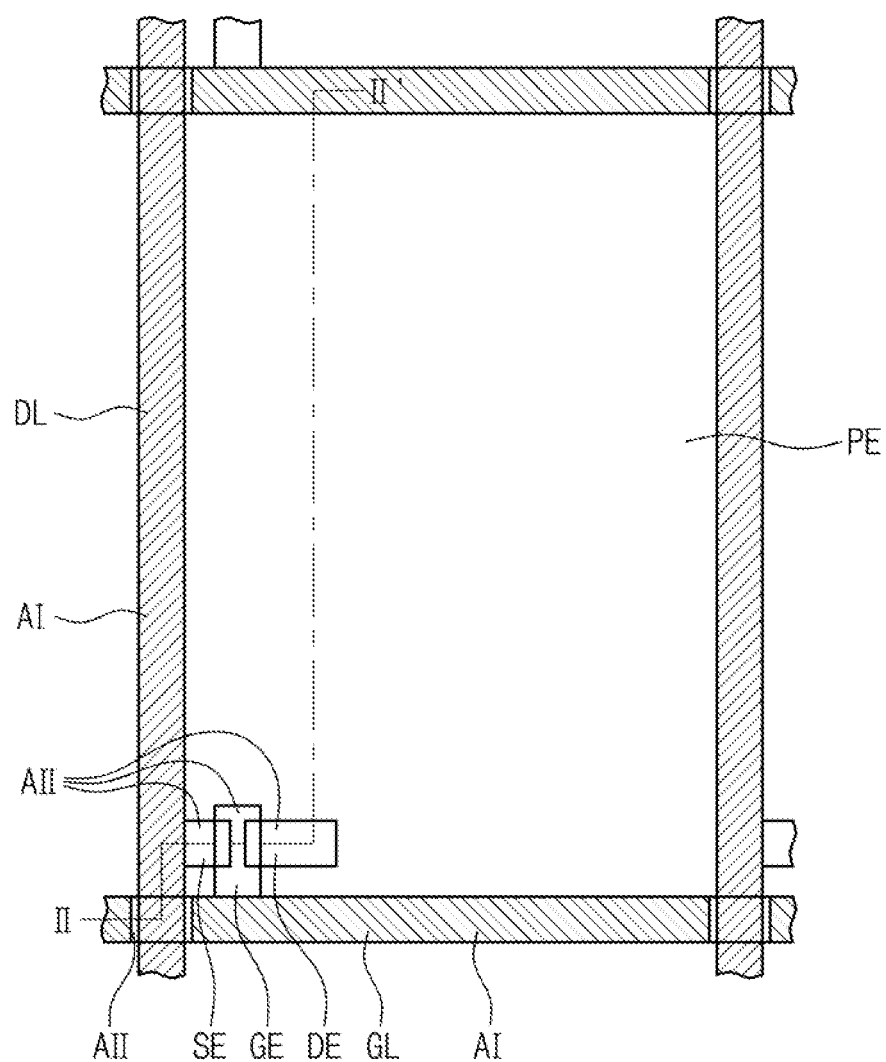
Figure 5C:
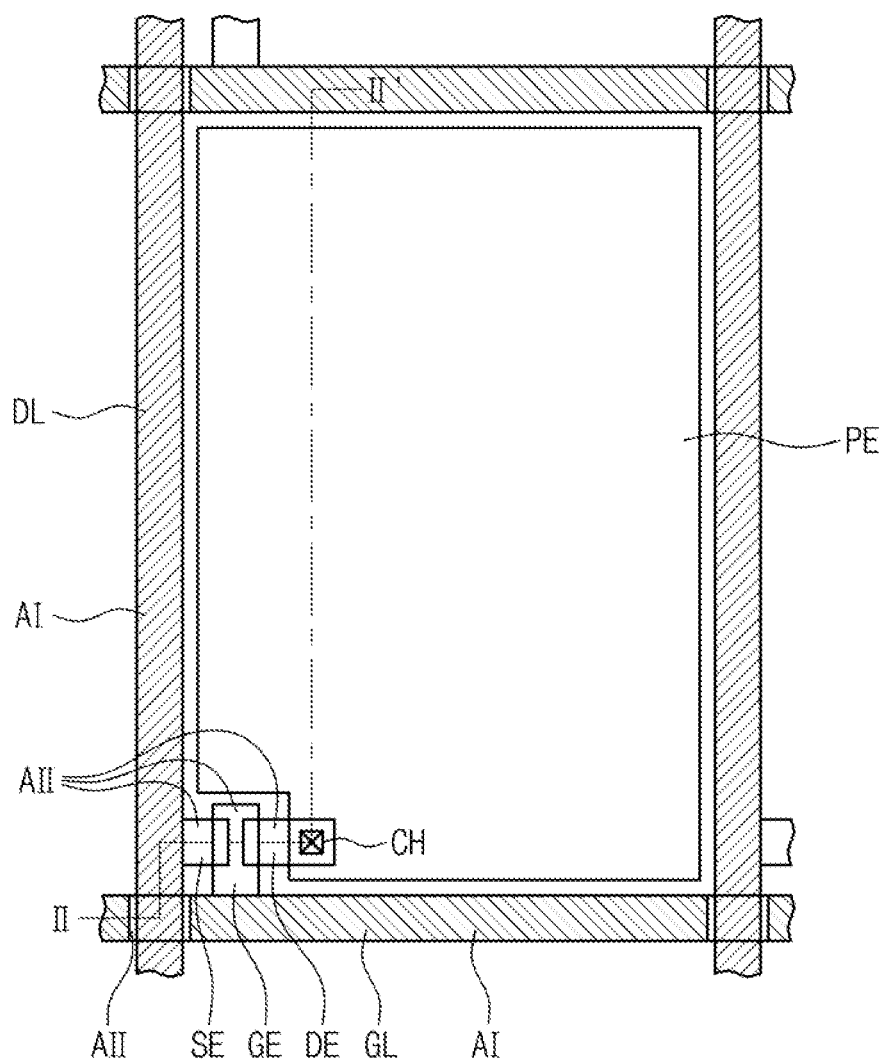
Figure 6A:
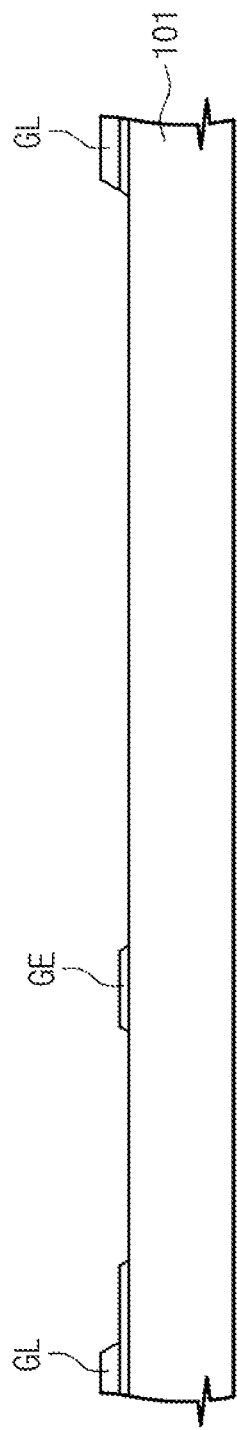
FIGS. 6A to 6C are sectional views respectively taken along line II-II of FIGS. 5A to 5C.
Figure 6B:
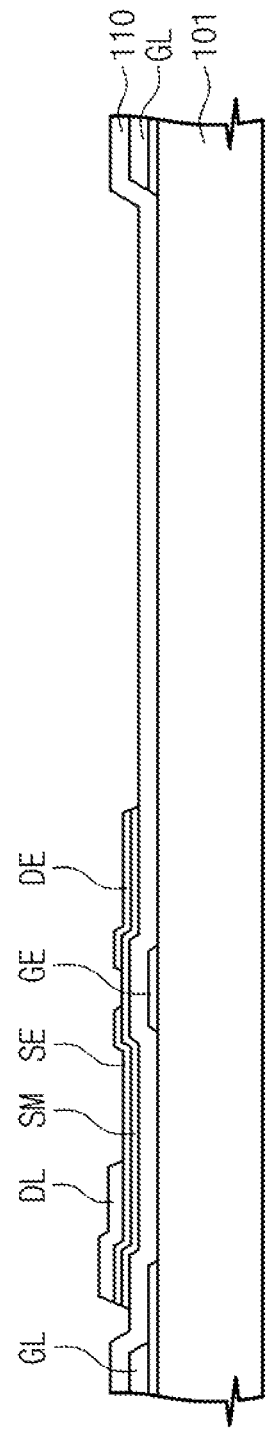
Figure 6C:
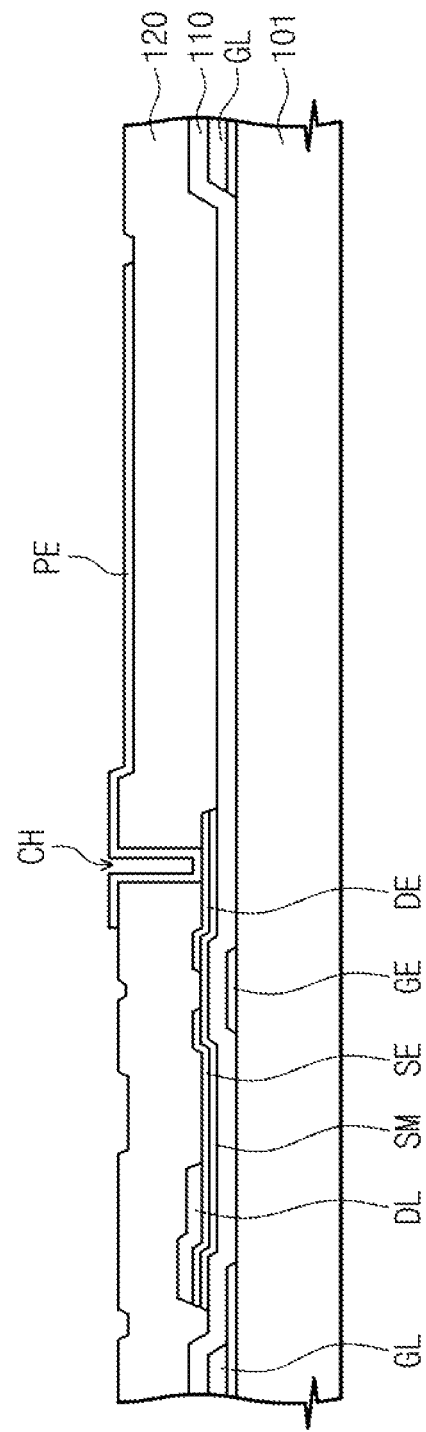

FIGS. 5A to 5C are plan views showing processes of forming the thin film transistor substrate of the method of manufacturing the display apparatus according to the first exemplary embodiment, and FIGS. 6A to 6C are sectional views respectively taken along line II-II of FIGS. 5A to 5C.

Referring to FIGS. 5A and 6A, the first wire part is formed on a first insulating substrate 101 using a first photolithography process. The first photolithography process is performed using the slit or diffraction mask employed in the manufacturing method of the wire according to the first and second exemplary embodiments. Accordingly, the gate line GL extended in the first direction and the gate electrode GE connected to the gate line GL are formed in the first wire part.

In the first wire part, the portion of the gate line GL, which is overlapped with the data line DL of the second wire part, and the gate electrode GE, which is overlapped with the source electrode SE and the drain electrode DE, have the thickness smaller than that of the other portion thereof. That is, when assuming that the area in which the wire has the relatively thicker thickness is referred to as the first area AI and the area in which the wire has the relatively thinner thickness is referred to as the second area AII, the portion of the gate line GL and the gate electrode GE are formed in the first area AI.

The gate line GL includes the first metal layer M1 and the second metal layer M2 in the first area AI and includes the first metal layer M1 in the second area AII.

In the case that the barrier layer (not shown) is formed on the first insulating substrate 101 before forming the first metal layer M1, the barrier layer may have a thickness of about 150 angstroms to about 250 angstroms.

Referring to FIGS. 5B and 6B, the second wire part is formed on the first insulating substrate, 101 on which the first wire part is formed, using the second photolithography process. The second photolithography process is performed using the slit or diffraction mask employed in the manufacturing method of the wire according to the first and second exemplary embodiments. In the second photolithography process, the semiconductor pattern SM is formed together with the second wire part.

FIGS. 7A to 7H are sectional views showing the second photolithography process of the method of manufacturing the display apparatus according to the first exemplary embodiment.

Figure 7A:
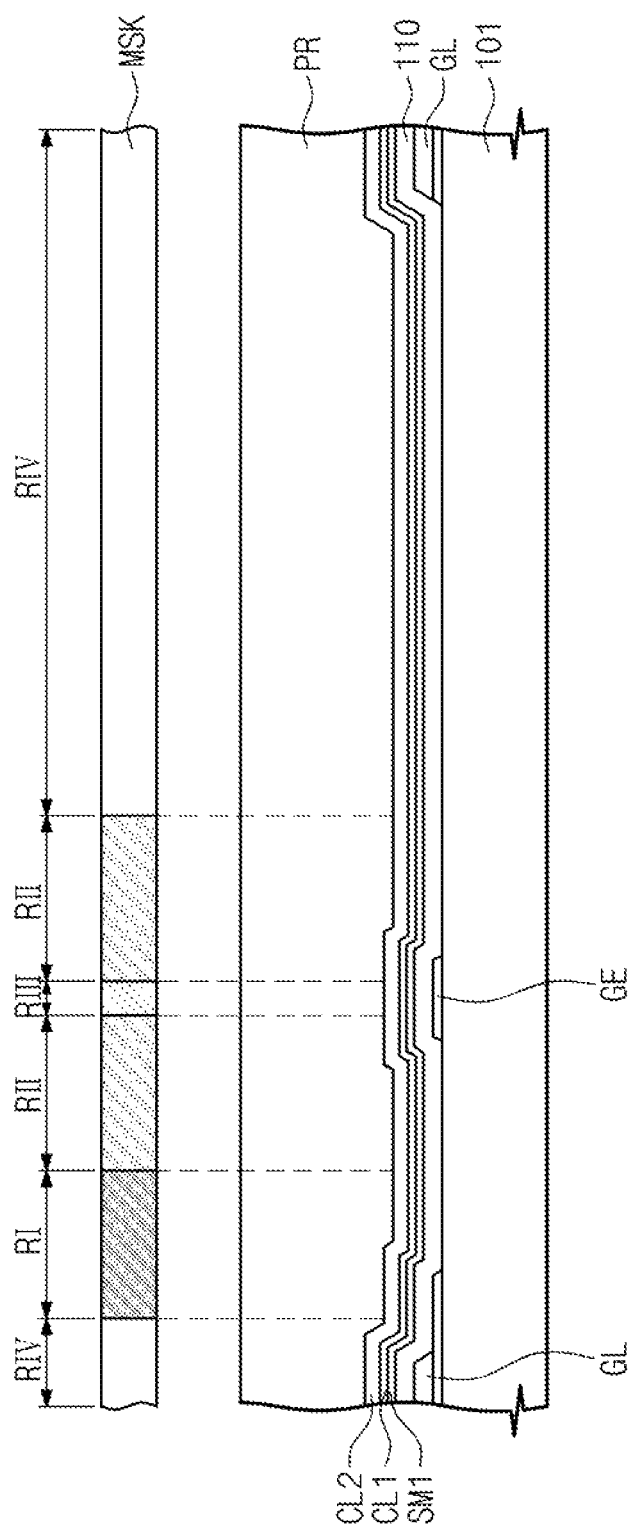

As shown in FIG. 7A, a first insulating layer 110, a semiconductor layer SM1, a first conductive layer CL1, and a second conductive layer CL2 are sequentially formed on the first insulating substrate 101 on which the first wire part. The first conductive layer CL1 and the second conductive layer CL2 are metal materials and have different etch rate.

The first conductive layer CL1 may have a thickness different from a thickness of the second conductive layer CL2. For example, the first conductive layer CL1 may have a thickness of about 2000 angstroms to about 4000 angstroms, and the second conductive layer CL2 may have a thickness of about 10000 angstroms to about 15000 angstroms.

Then, the photoresist layer PR including the photosensitive material is formed over the first insulating substrate 101, and the light is irradiated onto the photoresist layer PR through the mask MSK.

The mask MSK may be the diffraction mask or the slit mask. The mask MSK includes a first region RI to block the light, a second region RII to block a portion of the light and transmit a portion of the light, a third region RIII to transmit the light more than that in the second region RII, and a fourth region RIV to transmit the light, and the light may be irradiated onto the photoresist layer PR after transmitting through the mask MSK. In the present exemplary embodiment, since the base substrate 10 is disposed under the mask MSK, the base substrate 10 may be divided plural regions respectively corresponding to the first, second, third, and fourth regions RI, RII, RIII, and RIV. Thus, the divided regions of the base substrate 10 will be referred to as a first region RI, a second region RII, a third region RIII, and a fourth region RIV. In the present exemplary embodiment, the area in which the data line DL is formed corresponds to the first region RI, the area in which the source electrode SE and the drain electrode DE are formed corresponds to the second region RII, and the area in which the channel is formed corresponds to the third region RIII.

When the photoresist layer PR exposed to the light provided through the mask MSK is developed, as shown in FIG. 7B, the first photoresist layer pattern PR1 to the third photoresist layer pattern PR3 are formed in the first region RI to the third region RIII, respectively, and the photoresist layer PR in the fourth region RIV is completely removed to expose the surface of the second conductive layer CL2. The first to third photoresist layer patterns PR1, PR2, and PR3 may have different thicknesses from each other due to the exposure amount. In detail, the second photoresist layer pattern PR2 has a thickness smaller than that of the first photoresist layer pattern PR1 and the third photoresist layer pattern PR3 has a thickness smaller than that of the second photoresist layer pattern PR2.

In the present exemplary embodiment, a positive photoresist is used to remove the exposed portion of the photoresist layer, but it should not be limited thereto or thereby. That is, a negative photoresist may be used to remove the no-exposed portion of the photoresist layer.

As shown in FIG. 7C, the semiconductor layer SM1, the first conductive layer CL1, and the second conductive layer CL2 are selectively removed using the first to third photoresist layer patterns PR1 to PR3 as the mask. Accordingly, the semiconductor pattern SM is formed on the gate electrode GE, and the first and second conductive layers CL1 and CL2 are patterned to form the first conductive pattern CL1A and a first second-conductive pattern CL2A, respectively. The semiconductor layer SM1, the first conductive layer CL1, and the second conductive layer CL2 may be etched by a dry etch process or a wet etch process. Particularly, the first and second conductive layers CL1 and CL2 may be wet-etched using an etchant applied to etch the first and second metal layers.

A portion of the first photoresist layer pattern PR1, a portion of the second photoresist layer pattern PR2, and the third photoresist layer pattern PR3 are removed by the ashing process or the etch back process. Thus, as shown in FIG. 7D, the third photoresist layer pattern PR3 in the third region RIII is completely removed to expose a portion of the first second-conductive pattern CL2A.

During the patterning process, the first photoresist layer pattern PR1 and the second photoresist layer pattern PR2 are etched by the thickness of the third photoresist layer pattern PR3, so a fourth photoresist layer pattern PR4 and a fifth photoresist pattern PR5 are formed. The fourth photoresist layer pattern PR4 is formed in the first region RI and the fifth photoresist layer pattern PR5 is formed in the second region RII.

As shown in FIG. 7E, the first conductive pattern CL1A and the first second-conductive pattern CL2A are selectively etched using the fourth photoresist layer pattern PR4 and the fifth photoresist layer pattern PR5 as the mask to form the first metal layer M1 and a second second-conductive pattern CL2B. As a result, the surface of the semiconductor pattern SM in the third region RIII is exposed to form the channel.

A portion of the fourth photoresist layer pattern PR4 and the fifth photoresist layer pattern PR5 are removed by the ashing process or the etch back process. Accordingly, the fifth photoresist layer patter PR5 in the second region RII is completely removed to expose the portion of the surface of the second second-conductive pattern CL2B as shown in FIG. 7F.

The fourth photoresist layer pattern PR4 is etched by the thickness of the fifth photoresist layer pattern PR5 to form a sixth photoresist layer pattern PR6. The sixth photoresist layer pattern PR6 remains in the first region RI.

As shown in FIG. 7G, the second second-conductive pattern CL2B is selectively etched using the sixth photoresist layer pattern PR6 as a mask to form the second metal layer M2. The second second-conductive pattern may be etched by a wet etch process. The etchant applied to the wet etch process may have a relatively high etch selectivity with respect to the second metal layer M2 of the first and second metal layers M1 and M2.

As shown in FIG. 7H, when the sixth photoresist layer pattern PR4 is removed, the data line DL including the first and second metal layers M1 and M2, the source electrode SE including the first metal layer M1, and the drain electrode DE including the first metal layer M1 are formed.

Meanwhile, the pixel electrode PE is formed on the first insulating substrate 101, on which the second insulating layer 120 is formed, using third and fourth photolithography processes. The forming method of the pixel electrode PE will be described with reference to FIGS. 8A and 8B.

FIGS. 8A and 8B are sectional views showing the third photolithography process and the fourth photolithography process of the method of manufacturing the display apparatus according to the first exemplary embodiment.

Referring to FIG. 8A, the second insulating layer 120 provided with the contact hole CH through which a portion of the drain electrode DE is exposed is formed on the first insulating substrate 101, on which the second wire part is formed, using the third photolithography process.

In order to form the second insulating layer 120, an insulating material (not shown) and a photoresist layer (not shown) are sequentially formed on the first insulating substrate 101 on which the second wire part is formed. Then, the photoresist layer is exposed and developed to form a photoresist layer pattern, and the portion of the insulating material is etched by using the photoresist layer pattern as a mask.

Referring to FIG. 8B, the pixel electrode PE is formed on the second insulating layer 120 using the fourth photolithography process. The pixel electrode PE is connected to the drain electrode DE through the contact hole CH. In order to form the pixel electrode PE, a transparent conductive material (not shown) and a photoresist layer (not shown) are sequentially formed on the first insulating substrate 101 on which the second insulating layer 120 is formed. Then, the photoresist layer is exposed and developed to form a photoresist layer pattern, and the transparent conductive material is patterned using the photoresist layer pattern as a mask, thereby forming the pixel electrode PE.

The thin film transistor substrate, i.e., first substrate 100 is coupled to the second substrate 200 while facing the second substrate 200. The liquid crystal layer 300 is formed between the first substrate 100 and the second substrate 200.

As described above, the thin film transistor substrate may be manufactured by four times of photolithography processes using the first to fourth masks. The first wire part may be formed by the first photolithography process, and the second wire part may be formed by the second photolithography process together with the semiconductor pattern. Accordingly, the number of the photolithography processes applied to manufacture the thin film transistor substrate may be reduced and the step difference on the first substrate 100 may be minimized, thereby reducing the manufacturing time and cost of the thin film transistor substrate and preventing the disconnection when the second wire part is formed.

In the present exemplary embodiment, the thin film transistor substrate manufactured by using the method of manufacturing the wire according to the first exemplary embodiment has been described, but it should not be limited thereto. That is, the thin film transistor substrate may be manufactured by using the manufacturing method of the wire according to the second exemplary embodiment. The processes in the second exemplary embodiment are the same as the processes in the first exemplary embodiment except for the first metal layer including the main metal layer and the etch stop layer.

According to another exemplary embodiment, although the thin film transistor substrate is manufactured by four times of photolithography processes, the second wire part and the semiconductor pattern formed by the second photolithography process may be different from that in the manufacturing method of the thin film transistor substrate according to the first exemplary embodiment.

FIGS. 9A to 9I are sectional views showing the second photolithography process of the method of manufacturing the display apparatus according to a second exemplary embodiment of the present invention, and FIGS. 10A and 10B are sectional views showing the third photolithography process and the fourth photolithography process of the method of manufacturing the display apparatus according to a second exemplary embodiment of the present invention. In FIGS. 9A to 9I and 10A and 10B, the same reference numerals denote the same elements in FIGS. 7A to 7H and 8A and 8B, and thus detailed description of the same elements will be omitted. Particularly, since the first photolithography process in the second exemplary embodiment is the same as the first photolithography process in the first exemplary embodiment, the description of the first photolithography process in the second exemplary embodiment will be omitted.

Hereinafter, the second photolithography process of the manufacturing method of the thin film transistor substrate according to the second exemplary embodiment will be described with reference to FIGS. 9A to 9I.

As shown in FIG. 9A, a first insulating layer 110, a semiconductor pattern SM1, a first conductive layer CL1, and a second conductive layer CL2 are sequentially stacked on a first insulating substrate 101 on which the first wire part is formed. The first conductive layer CL1 is formed of a first metal material and the second conductive layer CL2 is formed of a second metal material having an etch rate different from that of the first metal material.

Then, a photoresist layer PR including a photosensitive material is formed over the first insulating substrate 101 and a light is irradiated onto the photoresist layer PR through the mask MSK. The mask MSK may be the diffraction mask or the slit mask. The mask MSK includes a first region RI to block the light, a second region RII to block a portion of the light and transmit a portion of the light, a third region RIII to transmit the light more than that in the second region RII, and a fourth region RIV to transmit the light, and the light may be irradiated onto the photoresist layer PR after transmitting through the mask MSK. In the present exemplary embodiment, since the base substrate 10 is disposed under the mask MSK, the base substrate 10 may be divided plural regions respectively corresponding to the first, second, third, and fourth regions RI, RII, RIII, and RIV. Thus, the divided regions of the base substrate 10 will be referred to as a first region RI, a second region RII, a third region RIII, and a fourth region RIV. In the present exemplary embodiment, the area in which the channel is formed corresponds to the first region RI, the area in which the data line DL is formed corresponds to the second region RII, and the area in which the source electrode SE and the drain electrode DE are formed corresponds to the third region RIII.

Figure 9B:
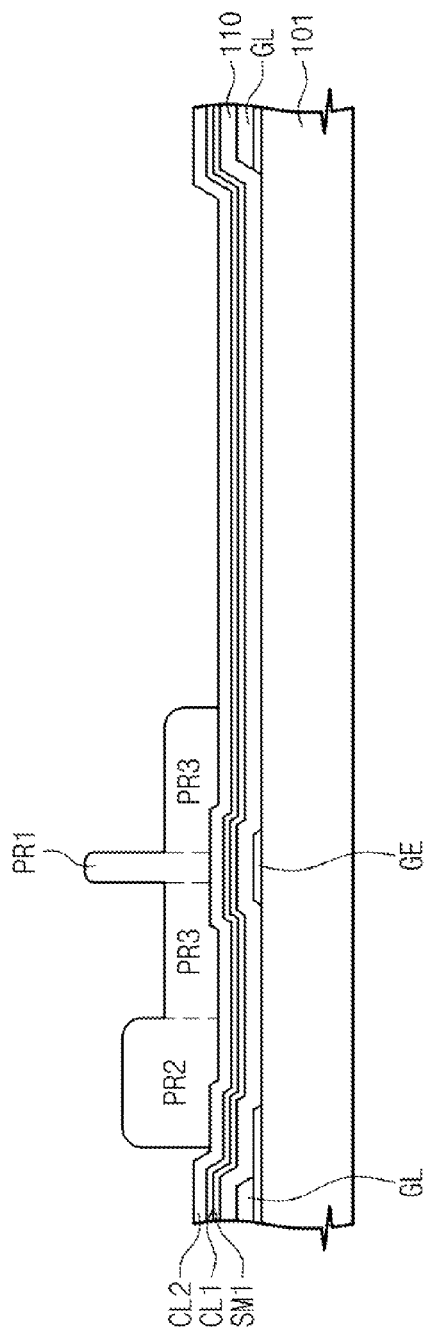

When the photoresist layer PR exposed to the light provided through the mask MSK is developed, as shown in FIG. 9B, the first photoresist layer pattern PR1 to the third photoresist layer pattern PR3 are formed in the first region RI to the third region RIII, respectively, and the photoresist layer PR in the fourth region RIV is completely removed to expose the surface of the second conductive layer CL2. The first to third photoresist layer patterns PR1, PR2, and PR3 may have different thicknesses from each other due to the exposure amount. That is, the second photoresist layer pattern PR2 has a thickness smaller than that of the first photoresist layer pattern PR1 and the third photoresist layer pattern PR3 has a thickness smaller than that of the second photoresist layer pattern PR2.

Figure 9C:
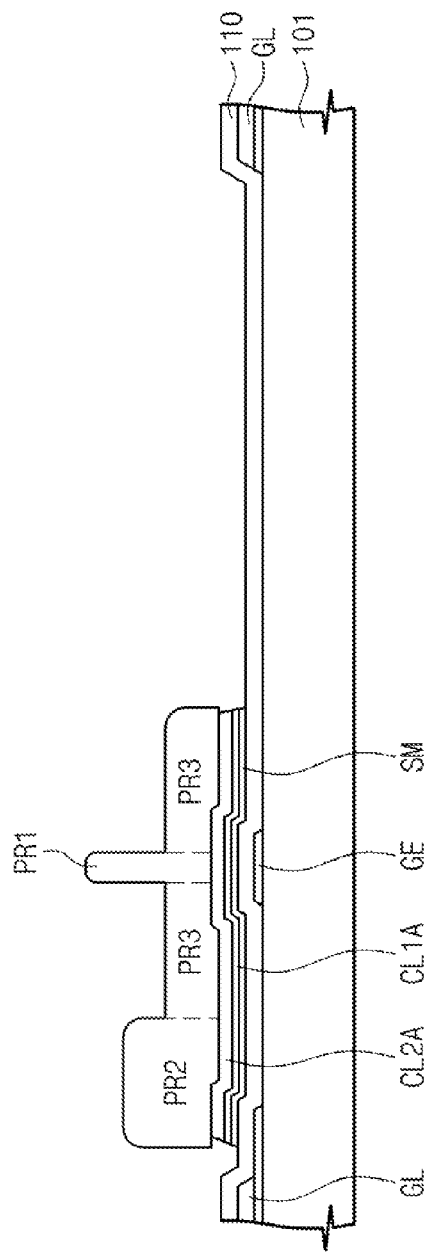

As shown in FIG. 9C, the semiconductor layer SM1, the first conductive layer CL1, and the second conductive layer CL2 are selectively removed using the first to third photoresist layer patterns PR1 to PR3 as the mask. Accordingly, the semiconductor pattern SM is formed on the gate electrode GE, and the first and second conductive layers CL1 and CL2 are patterned to form the first conductive pattern CL1A and a first second-conductive pattern CL2A, respectively. The semiconductor layer SM1, the first conductive layer CL1, and the first second-conductive layer CL2 may be etched by a dry etch process or a wet etch process. Particularly, the first and second conductive layers CL1 and CL2 may be wet-etched using an etchant applied to etch the first and second metal materials.

A portion of the first photoresist layer pattern PR1, a portion of the second photoresist layer pattern PR2, and the third photoresist layer pattern PR3 are removed by the ashing process or the etch back process. Thus, as shown in FIG. 9D, the third photoresist layer pattern PR3 in the third region RIII is completely removed to expose a portion of the first second-conductive pattern CL2A.

During the patterning process, the first photoresist layer pattern PR1 and the second photoresist layer pattern PR2 are etched by the thickness of the third photoresist layer pattern PR3, so that a fourth photoresist layer pattern PR4 and a fifth photoresist pattern PR5 are formed. The fourth photoresist layer pattern PR4 is formed in the first region RI and the fifth photoresist layer pattern PR5 is formed in the second region RII.

As shown in FIG. 9E, the first second-conductive pattern CL2A is selectively etched using the fourth photoresist layer pattern PR4 and the fifth photoresist layer pattern PR5 as the mask to form a second second-conductive pattern CL2B. In this case, the first second-conductive pattern CL2A is etched by a wet etch process, and an undercut occurs in the second second-conductive pattern CL2B disposed under the fourth and fifth photoresist layer patterns PR4 and PR5.

A portion of the fourth photoresist layer pattern PR4 and the fifth photoresist layer pattern PR5 are removed by the ashing process or the etch back process. Accordingly, the fifth photoresist layer patter PR5 in the second region RII is completely removed to expose the portion of the surface of the second second-conductive pattern CL2B in the second region RII as shown in FIG. 9F.

The fourth photoresist layer pattern PR4 is etched by the thickness of the fifth photoresist layer pattern PR5, to thereby form a sixth photoresist layer pattern PR6. The sixth photoresist layer pattern PR6 remains in the first region RI.

As shown in FIG. 9G, a third insulating layer 130 is formed over the first insulating substrate 101 on which the sixth photoresist layer pattern PR6 is formed. The third insulating layer 130 may be an inorganic material such as silicon nitride (SiNx). The third insulating layer 130 may be not formed in the undercut area or may be formed to have relatively thin thickness in the undercut area.

As shown in FIG. 9H, the sixth photoresist layer pattern PR6 and a portion of the third insulating layer 130, which is formed on the sixth photoresist layer pattern PR6, are removed by a lift-off process. As a result, the upper surface of the second second-conductive pattern CL2B is exposed and the third insulating layer 130 remains in the second, third, and fourth regions RII, RIII, and RIV except for the first region RI.

As shown in FIG. 9I, the second second-conductive pattern CL2B in the first region RI and a portion of the first conductive pattern CL1A are etched using the third insulating layer 130 as a mask. Thus, the upper surface of the semiconductor pattern SM in the first region RI is exposed, and the source electrode SE and the drain electrode DE are formed.

Meanwhile, the pixel electrode PE is formed on the first insulating substrate 101, on which the second insulating layer 120 is formed, using third and fourth photolithography processes. The forming method of the pixel electrode PE will be described with reference to FIGS. 10A and 10B.

Referring to FIG. 10A, the third insulating layer 130 having the contact hole CH through which a portion of the drain electrode DE is exposed is formed on the first insulating substrate 101, on which the second insulating layer 120 is formed, using the third photolithography process.

In order to form the third insulating layer 130, an insulating material (not shown) and a photoresist layer (not shown) are sequentially formed on the first insulating substrate 101 on which the second insulating is formed. Then, the photoresist layer is exposed and developed to form a photoresist layer pattern, and the portion of the insulating material and the second insulating layer 120 are etched by using the photoresist layer pattern as a mask.

Referring to FIG. 10B, the pixel electrode PE is formed on the third insulating layer 130 using the fourth photolithography process. The pixel electrode PE is connected to the drain electrode DE through the contact hole CH. In order to form the pixel electrode PE, a transparent conductive material (not shown) and a photoresist layer (not shown) are sequentially formed on the first insulating substrate 101 on which the third insulating layer 130 is formed. Then, the photoresist layer is exposed and developed to form a photoresist layer pattern, and the transparent conductive material is patterned using the photoresist layer pattern as a mask, thereby forming the pixel electrode PE.

As described above, the thin film transistor substrate may be manufactured by four times of photolithography processes using the first to fourth masks. The first wire part may be formed by the first photolithography process, and the second wire part may be formed by the second photolithography process together with the semiconductor pattern. Accordingly, the number of the photolithography processes applied to manufacture the thin film transistor substrate may be reduced and the step difference on the first substrate 100 may be minimized, thereby reducing the manufacturing time and cost of the thin film transistor substrate and preventing the disconnection when the second wire part is formed.

In the above exemplary embodiments, the liquid crystal display has been described as the display apparatus, however the thin film transistor substrate should not be limited to the liquid crystal display. That is, the thin film transistor substrate according to the above-described exemplary embodiments may be employed in various display apparatuses, such as organic light emitting display, plasma display panel, microelectromechanical system, etc.

Although the exemplary embodiments have been described, it is understood that the present invention should not be limited to those shown and that various changes and modifications can be made by one ordinary skilled in the art as hereinafter claimed.

What is claimed is:

1. A display apparatus comprising:
    an insulating substrate;
    a first wire part provided on the insulating substrate;
    a second wire part provided on the insulating substrate and at least partially over the first wire part while being insulated from the first wire part; and
    a pixel connected to the second wire part,
    wherein the first wire part has a first thickness in a first area and a second thickness smaller than the first thickness in a second area different from the first area, and the second area comprises at least an area in which the first wire part is overlapped by the second wire part;
    wherein the second wire part has a substantially same thickness in the second area as outside the second area; and
    wherein, in the second area, the first wire part has the second thickness across substantially its entire width.

2. The display apparatus of claim 1, wherein in the first area, each of the first wire part and the second wire part comprises a first metal layer and a second metal layer disposed on the first metal layer, and in the second area, the first wire part comprises the first metal layer.

3. The display apparatus of claim 2, wherein:
    the first wire part comprises a gate line extended in a first direction to transmit a first signal and a gate electrode connected to the gate line,
    the second wire part comprises a data line extended in a second direction different from the first direction to transmit a second signal, a source electrode connected to the data line, and a drain electrode spaced apart from the source electrode, and
    the pixel comprises a pixel electrode configured to be charged with the second signal.

4. The display apparatus of claim 3, wherein the gate line has the second thickness in an overlap area in which the gate line overlaps the data line, and has the first thickness in an area different from the overlap area.

5. The display apparatus of claim 3, wherein the gate electrode has the second thickness.

6. The display apparatus of claim 3, wherein the data line has the first thickness and the source and drain electrodes have the second thickness.

7. The display apparatus of claim 3, further comprising:
    a first insulating layer that covers the first wire part; and
    a second insulating layer that covers the second wire part and is provided with a contact hole to expose a portion of the drain electrode, wherein the pixel electrode is provided on the second insulating layer and connected to the drain electrode through the contact hole.

8. The display apparatus of claim 7, further comprising a semiconductor pattern provided on the first insulating layer, wherein the second insulating layer comprises an opening to expose an upper surface of the semiconductor pattern corresponding to an area between the source electrode and the drain electrode.

9. The display apparatus of claim 3, further comprising:
    a first insulating layer that covers the first wire part;
    a semiconductor pattern provided on the first insulating layer to overlap the gate electrode;
    a second insulating layer that covers the second wire part and is provided with an opening through which the semiconductor pattern between the source electrode and the drain electrode is exposed and provided with a contact hole through which a portion of the drain electrode is exposed; and
    a third insulating layer that covers the second insulating layer and is provided with a contact hole corresponding to the contact hole of the second insulating layer to expose the portion of the drain electrode, wherein the pixel electrode is provided on the third insulating layer and connected to the drain electrode through the contact hole formed through the second and third insulating layer.

* * * * *